US012314232B2

(12) United States Patent
Kussmann et al.

(10) Patent No.: US 12,314,232 B2
(45) Date of Patent: *May 27, 2025

(54) SHARED HIERARCHICAL DATA DESIGN MODEL FOR TRANSFERRING DATA WITHIN DISTRIBUTED SYSTEMS

(71) Applicant: State Farm Mutual Automobile Insurance Company, Bloomington, IL (US)

(72) Inventors: Scott D. Kussmann, Bloomington, IL (US); Christopher L Tallyn, Minonk, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,472

(22) Filed: Jan. 10, 2024

(65) Prior Publication Data

US 2024/0143561 A1 May 2, 2024

Related U.S. Application Data

(63) Continuation of application No. 17/406,789, filed on Aug. 19, 2021, now Pat. No. 11,907,185.

(Continued)

(51) Int. Cl.
*G06F 16/00* (2019.01)
*G06F 16/21* (2019.01)
(Continued)

(52) U.S. Cl.
CPC ........ *G06F 16/212* (2019.01); *G06F 16/2272* (2019.01); *G06F 16/26* (2019.01); *H04L 67/133* (2022.05)

(58) Field of Classification Search
CPC .... G06F 16/212; G06F 16/2272; G06F 16/26; G06F 16/2228; G06F 16/211; H04L 67/133
See application file for complete search history.

(56) References Cited

U.S. PATENT DOCUMENTS 5,630,125 A    5/1997   Zellweger
5,649,102 A    7/1997   Yamauchi et al.
(Continued)

FOREIGN PATENT DOCUMENTS

EP         1851649      11/2007
EP         1872328      2/2008

OTHER PUBLICATIONS

Office Action for U.S. Appl. No. 17/406,789, mailed on Jun. 13, 2023, Kussmann, "Shared Hierarchical Data Design Model for Transferring Data Within Distributed Systems", 10 Pages.

(Continued)

*Primary Examiner* — Debbie M Le
(74) *Attorney, Agent, or Firm* — Lee & Hayes, P.C.

(57) ABSTRACT

Various techniques described herein relate to using a shared hierarchical data design model for creating and transferring data within distributed systems. Components within a distributed system may access a shared hierarchical data design model when designing and creating software components, data structures, or application programming interfaces (APIs) through which data is transferred. Additional techniques include verifying and enforcing that the components of the distributed system conform with the shared hierarchical data design model, including using design/development environments and element-by-element analyses of the data structures transferred between components of the distributed system.

20 Claims, 8 Drawing Sheets

Related U.S. Application Data

(60) Provisional application No. 63/068,203, filed on Aug. 20, 2020.

(51) Int. Cl.
*G06F 16/22* (2019.01)
*G06F 16/26* (2019.01)
*H04L 67/133* (2022.01)

(56) References Cited

U.S. PATENT DOCUMENTS

| | | | |
|---|---|---|---|
| 8,671,105 B2 | 3/2014 | Reddy et al. | |
| 8,938,711 B2 * | 1/2015 | McCarty | G06F 3/0482 717/105 |
| 10,621,193 B2 | 4/2020 | Bradham | |
| 10,671,595 B2 | 6/2020 | Upadhyaya et al. | |
| 10,706,166 B1 | 7/2020 | Mandadi et al. | |
| 10,789,219 B1 | 9/2020 | Anagnoson et al. | |
| 10,860,549 B2 | 12/2020 | Samara et al. | |
| 10,938,950 B2 | 3/2021 | Evans et al. | |
| 11,023,835 B2 | 6/2021 | Huneycutt et al. | |
| 2005/0273721 A1 | 12/2005 | Yantis | |
| 2007/0239742 A1 * | 10/2007 | Saha | G06F 16/9024 |
| 2014/0310683 A1 | 10/2014 | McCarty | |
| 2021/0397171 A1 * | 12/2021 | Sayyarrodsari | G06F 8/34 |
| 2022/0058165 A1 | 2/2022 | Kussmann et al. | |

OTHER PUBLICATIONS

Office Action for U.S. Appl. No. 17/406,789, mailed on Dec. 16, 2022, Kussmann, "Shared Hierarchical Data Design Model for Transferring Data Within Distributed Systems", 9 Pages.

\* cited by examiner

SHARED HIERARCHICAL DATA DESIGN MODEL FOR TRANSFERRING DATA WITHIN DISTRIBUTED SYSTEMS

RELATED APPLICATIONS

This application claims priority to and is a continuation of U.S. patent application Ser. No. 17/406,789, filed Aug. 19, 2021, and entitled "SHARED HIERARCHICAL DATA DESIGN MODEL FOR TRANSFERRING DATA WITHIN DISTRIBUTED SYSTEMS," which claims priority to U.S. Provisional Patent Application No. 63/068,203, filed Aug. 20, 2020, and entitled "SHARED HIERARCHICAL DATA DESIGN MODEL FOR TRANSFERRING DATA WITHIN DISTRIBUTED SYSTEMS," the disclosures of both of which are incorporated by reference herein in their entirety for all purposes.

BACKGROUND

Modern computing systems often include various software components, devices, systems, and data centers interacting across a distributed computing environment. Large-scale distributed computing systems may be implemented as enterprise systems or other organization-wide computing systems, and may maintain a variety of storage components (e.g., data stores) and software components operating on various different computing infrastructures. Such computing infrastructures may include different computing devices, data centers, public or private cloud infrastructures, or computing infrastructure within a distributed system. The various software and storage components of a distributed system may reside on client systems and/or server systems, either inside or outside of a firewall or secure network infrastructures.

Within distributed computing systems, the software and storage components often include combinations of legacy and newer components, operating on different platforms and within different devices or data centers of the distributed system. The various software and storage components may have different development, testing, and deployment processes within their respective systems, during which independent developers design, create, and deploy the software and data storage solutions. During such processes, designers and developers may independently determine the data structures generated and used by the software, including determining data designs based on schemas, data elements, and relationships between elements. Designers and developers also select and assign names, types, and other attributes for data elements, including defining derived elements and data dependencies. Interactions between software components and devices in distributed systems often include one device or system transferring structured data to another device or system. For example, individual software components and applications may transfer data to other components and applications by creating, populating, and transmitting data structures during execution of a software application or service. Additional examples of transferring data within distributed systems include transferring data structures between devices or servers (e.g., data centers) during data migration, replication, and backup tasks, etc.

However, errors and inefficiencies may result from transferring data structures between components, devices, and servers in a distributed system, when a common data design is not used across the distributed system. For instance, when transferring or receiving data structures within a distributed system, various components within the system may be required to perform data formatting and data integration techniques on non-uniform data structures for compatibility with other components. Additionally, when non-uniform data is transferred between different devices of a distributed system, data non-uniformity may cause errors or inefficiencies in various other components such as network monitoring components, performance monitoring components, and data analytics components. Further, when the components in a distributed system are designed to transfer non-uniform data structures to other components, upgrades and new development within the distributed system may be more cumbersome and time-consuming. For instance, the use of non-uniform data designs across a distributed system may cause errors when upgrading legacy systems, and may greatly prolong development lifecycles for new components of the distributed system.

SUMMARY

To address these problems and inefficiencies within distributed computing systems, this disclosure describes various techniques for using a shared hierarchical data design model for creating and transferring data within distributed systems. Techniques described herein can be implemented by various components within distributed systems (e.g., software components, applications, services, devices, and servers/data centers) to access a shared data design model when designing and creating software components, data structures, or application programming interfaces (APIs) through which data is transferred in the distributed system. Additional techniques relate to verifying and enforcing that the components within the distributed system conform with the shared hierarchical data design model, including using design/development environments and element-by-element analyses of the data structures transferred between components of the distributed system.

As described in the various examples below, in certain scenarios a shared hierarchical data design model may serve as an inventory of conformed data elements that provides data element "metadata" to independent system associated with different entities in a distributed systems (e.g., business partners such as actuaries, data scientists, etc.) and IT developer resources. The shared hierarchical data design model also may provide a logical hierarchical structure for relating the data elements contained within the data subject areas. Additionally, the shared hierarchical data design model may be used to design and build data structures during the system development phase of projects. Such application program interfaces (APIs) may be implemented into production code, and may be static or dynamic in various examples. In still other examples, the shared hierarchical data design model may be used to build conformed "views" of data for analyses initiated by independent systems (e.g., actuaries, data scientists and data engineers) to decide what data is predictive and can be used to build model that will automate rating and underwriting operations. In some examples, such models may be implemented into production but do not access any artifacts of the shared model during operational production processing.

In an example of the present disclosure, a system includes a first computing device storing a hierarchical data design model, and a second computing device comprising at least one processor and memory storing executable instructions that, when executed by the at least one processor, cause the second computing device to perform operations comprising receiving a first portion of the hierarchical data design model from the first computing device and via a network, determining a data design sub-model based at least in part on the first portion of the hierarchical data design model, creating a data structure using the data design sub-model, wherein the data structure comprises one or more elements, and wherein a first element of the one or more elements corresponds to a second element of the hierarchical data design model, and transmitting the data structure to a third computing device associated with a remote system.

In another example of the present disclosure, a method includes receiving, by a first computing device, a data design comprising at least a first data element, determining a first attribute of the first data element, receiving, from a second computing device, at least a portion of a hierarchical data design model, determining a second data element within the hierarchical data design model associated with the first data element, retrieving, from the hierarchical data design model, a second attribute associated with the second data element, determining that the first attribute corresponds to the second attribute, identifying a data structure associated with the data design, storing or transmitting the data structure associated with the data design, based at least in part on determining that the first attribute corresponds to the second attribute.

In yet another example of the present disclosure, a method includes receiving, via a software development environment, user input associated with a data design to be created via the software development environment, receiving, from a first computing device, at least a portion of a hierarchical data design model, determining a first data element within the hierarchical data design model, based on the user input data, receiving a definition of the first data element from the hierarchical data design model, and creating a data structure having the first data element, via the software development environment.

DETAILED DESCRIPTION

Figure 1:
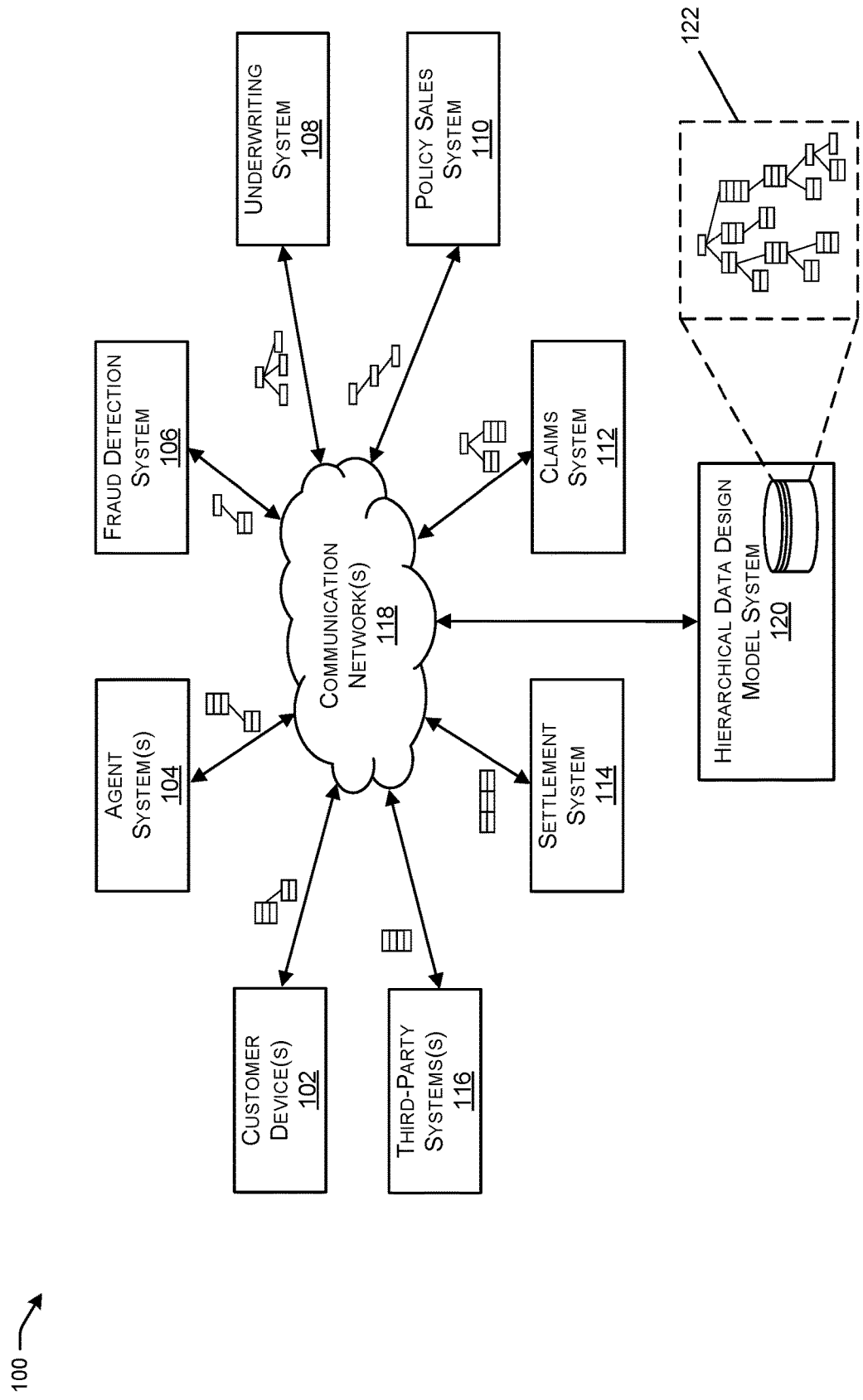
FIG. 1 illustrates a distributed computing system associated with a P&C insurance system, having various internal and external computer systems and a shared hierarchical data design model, in accordance with one or more examples of the present disclosure.

FIG. 1 illustrates an example distributed computing environment 100 (or distributed system 100) associated with a property and casualty (P&C) insurance system. In this example, a number of independent systems 102-116 interact through one or more communication networks 118 to provide various P&C features and functionalities to the different users of the systems 102-116. The systems 102-116 in the distributed computing environment 100 may be implemented on one or more physical computing devices (e.g., mobile devices, computers, servers, data centers, etc.), and may execute provide particular sets of functionalities within the distributed system 100 (e.g., user-facing interfaces, risk analyses, P&C policy-related features, data security and analytics, etc.). Additionally, some of the systems 102-116 in the distributed computing environment 100 may execute within an internal data center of a P&C insurance system and/or may operate on a secure private network, while other computer systems 102-116 may operate on external devices (e.g., independent user or third-party devices) and/or may operate on unsecure public networks.

As illustrated in FIG. 1, the distributed computing environment 100 also includes a hierarchical data design model system 120 (or model system 120) which is accessible to the systems 102-116 via communication networks 118. As described herein, a data design model may refer to a logical model defining the structure, attributes, and organization of data elements. As illustrated, the model system 120 may store a hierarchical data design model 122 (or shared model 122) that defines an arrangement of data elements that are related hierarchically such that a data element in the hierarchy includes one or more parent elements and/or child elements. The resulting data hierarchy may be stored in a single tree data structure as illustrated in this example, or in multiple non-overlapping tree data structures in other examples, where a node in the tree data structure corresponds to data element defining a particular type of data used within the distributed system 100. As described below in more detail, the independent systems 102-116 may access the model system 120 when designing, creating, and transferring data objects, structures, and sub-models in various types of data transfers.

In this example, the distributed computing environment 100 is implemented as a distributed P&C insurance system. Accordingly, the examples of independent systems 102-116 in the distributed computing environment 100 may include customer devices 102, such as mobile devices (e.g., smartphones, tablet computers, laptops, etc.) and other customer client devices executing client applications (e.g., a mobile insurance application) or a web browser though which a secure customer portal and insurance customer functionality may be provided to customers. Agent systems 104 may include independent agent computing devices and systems running agent-specific client applications and/or web browser through which a secure agent portal and insurance agent functionality may be provided to authorized agents. In this example, both the customer devices 102 and agent systems 104 may operate independently from the internal data centers of the insurance provider, and may access the insurance systems within the internal data centers via secure network components (e.g., a firewall) and the web services/server applications exposed by the insurance provider. For instance, within one or more data centers of the insurance provider, a fraud detection system 106 may execute statistical analysis and data modeling techniques to detect and analyze potential fraudulent transactions or claims, and may provide analysis tools and user interfaces to fraud detection personnel. Underwriting system 108 may execute automated underwriting and risk assessment tasks for potential policy offerings, and may provide underwriting and risk analysis tools to the underwriting personnel of the insurance provider. The policy sales system 110 may provide resources to agent systems 104 and/or customer systems 102 regarding policy details and offerings provided by the insurer. The claims system 112 may execute claims analysis, processing, and resolution software tools, interacting within claims and settlement personnel and fraud detection personnel of the insurance provider, and with customer systems 102 and/or agent systems 104. The settlement system 114 may execute tools to arrange and make payments to policyholders, and may interact with various internal systems as well as external customer systems 102 and/or agent systems 104. Additionally, one or more third-party systems 116 may interact with the other systems 102-114 in the distributed insurance system in this example. By way of illustration only, third-party systems 116 may include insurance broker systems, governmental and/or judicial data sources, or counterparties/insurers of counterparties associated with claims processed within the distributed computing environment 100.

The hierarchical data design model system 120 may be implemented on one or more physical computing and/or storage devices (e.g., computers, servers, data centers, etc.). Although this example illustrates a distributed system 100 and shared model 122 implemented for a P&C insurance system, the systems and techniques described herein are not limited insurance system implementations and use cases, but may be applied to any other type of distributed system 100 in which computing devices create and transfer data structures to other computing devices. Additionally, while this illustrates a simplified computing and networking architecture for the distributed system 100, other types of computing architectures, networks, and environments may be used in other examples. For instance, one or more independent systems 102-116 within the distributed computing environment 100 may be client systems in a client-server architecture with other systems 102-116. Additionally, any combination of the independent systems 102-116 may operate in cloud computing environments, such as public, private, or hybrid clouds, and/or may interact with the other distributed systems over any combination of network architectures.

As noted above, the various systems 102-116 may access the model system 120 and use the shared model 122 to design data objects and create data structures for transferring/transmitting to other components in the distributed computing environment 100. The shared hierarchical data design model 122 may include a set of common data element definitions to be used throughout the distributed computing environment 100, having an inventory of element names, data types, and/or other data element attributes. The shared model 122 also may define relationships between various data elements, include data dependencies and derived elements. Accordingly, independent systems 102-116 may retrieve and use the common data element definitions and element relationships from the shared hierarchical data design model 122 when creating, using, and transferring data structures, thereby assuring data uniformity across the distributed computing environment 100.

In various techniques described herein, the independent systems 102-116 may access the model system 120 when designing and creating data objects/structures that conform with the shared model 122. Additionally, systems 102-116 and/or additional components within the distributed computing environment 100 may implement software tools and/or techniques to verify and/or enforce conformance with the shared model 122, for any data structures created or transferred within the distributed computing environment 100. For example, software and data design tools may include user interfaces to allow import individual elements and/or sub-portions of the shared model 122 when designing software components, data structures, etc. Additionally, systems 102-116 may execute verification tools that compare the data element and relationships of their respective data structures with the data elements and relationships defined by the shared model 122. In some examples, verification tools may include enforcement techniques that require data structures to conform to the shared model 122, before the systems 102-116 are permitted to store or transfer the data structures.

In some examples, the shared model 122 includes a hierarchical structure with a single root node (or entity) corresponding to a subject area hierarchy. In such examples, each node may have a single parent so that there is no dual inheritance within the subject area hierarchy. Unlimited relationships that cross data subject area boundaries may be permitted. As a result, the shared model 122 may more accurately represent the particular industry or business associated with the shared model 122 (e.g., insurance), but also may retain clean and reusable data subject area-based hierarchies needed to build message structures that can move data in a consistent, flexible manner. Additionally, in such examples, the creation of individual data elements may be based on reusable data naming patterns, making existing data elements more understandable to business partners, and also allowing allow new data elements to be created in an automated and consistent manner. The data naming schemes used for the shared model 122 thus may result in data elements that speed up both systems development and business analytics operations. As an example, if an organization system associated with the distributed system 100 data element wanted to track data identifying the number of times a driver crosses a railroad track at noon, the data element name may be constructed such as "railroad crossing count 1130 am 1230 pm." After an initial data element name is established, the element name may be modified to count railroad crossings at any time of day, any day of week, etc. The element name also may be the basis for aggregation of railroad crossing counts on a trip level, daily level, weekly level, etc. By way of example, the variations on the initial element name may include "trip railroad crossing count 1130 am 1230 pm," "daily railroad crossing count 1130 am 1230 pm," and "monthly railroad crossing count 1130 am 1230 pm." These data element naming patterns may provide additional flexibility and support for innovative business analytics and practices. As shown in this example, element names for data elements that cross subject area boundaries may be constructed by appending individual data element names that are specific to individual subject areas.

The systems and techniques described herein for using a shared hierarchical data design model 122 within a distributed system 100 thus may increase data consistency and uniformity across the independent systems 102-116, resulting in improved interactions and collaborative processing within the distributed system 100. For instance, increased data uniformity among the independent systems 102-116 may increase processing efficiency and reduce errors within data integration components, causing improved functioning of the independent systems 102-116. Increased data uniformity within the distributed system 100 also may provide improvements by simplifying the systems upgrades and streamlining the development lifecycles for new software components within the distributed system 100. Data designs models and the resulting data structures/object may be created more quickly and consistently by using the shared hierarchical data design model 122, reducing the need for unnecessary data transformation and integration tasks, and reducing the complexity of software development and testing within the distributed system.

Figure 2A:
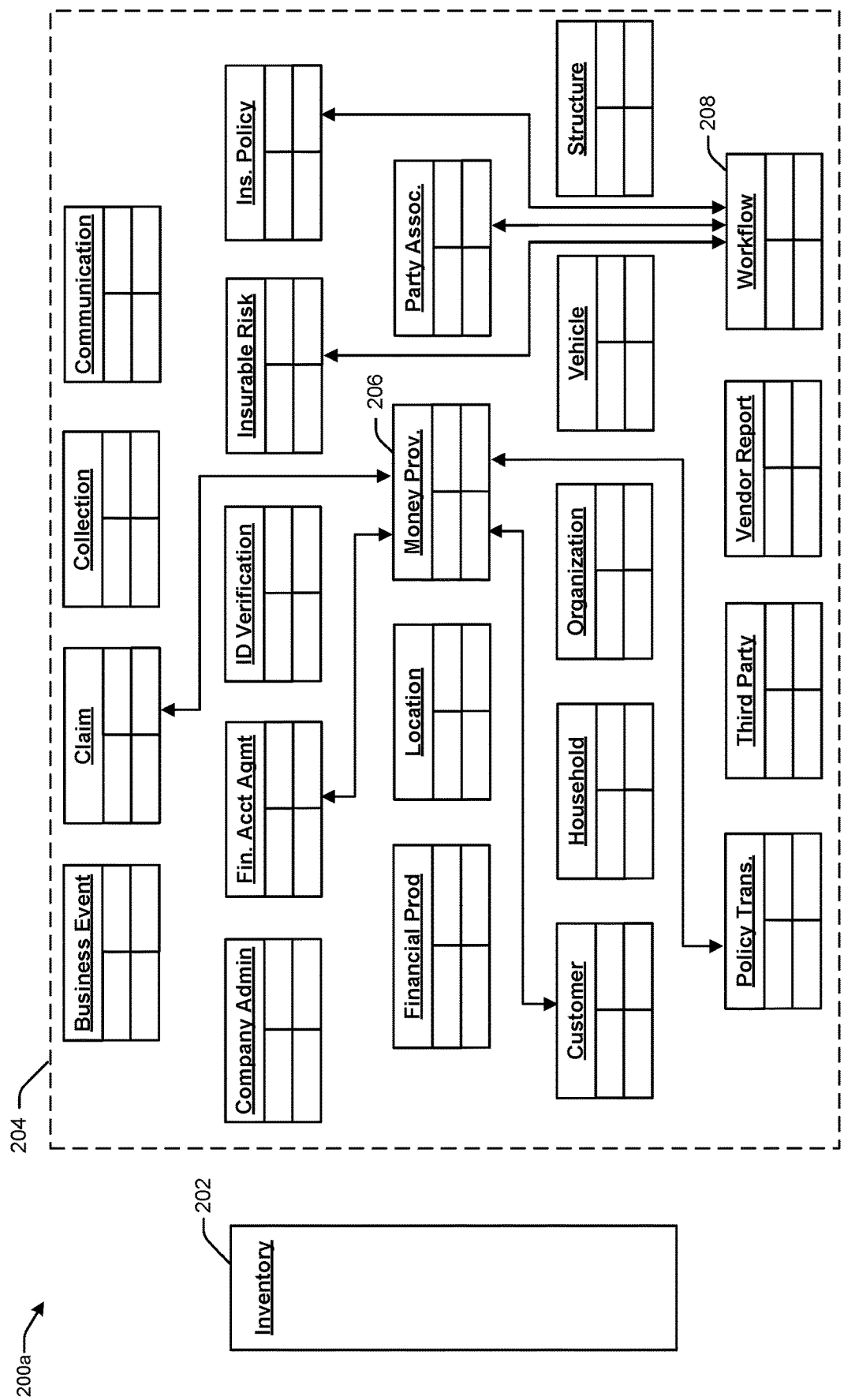
FIGS. 2A and 2B are two examples of a hierarchical data design model for use with a P&C insurance system, in accordance with one or more examples of the present disclosure.

FIG. 2A is an example of a hierarchical data design model 200a for use in a P&C insurance system. In this example, hierarchical data design model 200a includes an inventory 202 of data elements and data hierarchy 204 that defines that structure and relationships of the model 200a. The inventory 202 may include a listing of names of the data elements within the hierarchical data design model 200a. For a data element, the inventory also may include data identifying the location(s) of the data element within the data hierarchy 204.

In this example, the data design model 200a for the P&C insurance system is represented as a set of related sub-models. A sub-model within the data hierarchy 204 may include a subset of the data elements within the data design model 200a. A sub-model also may define the relationships (e.g., derived elements and data dependencies) between the data elements within the sub-model as well as relationships between data elements in different sub-models. For clarity and legibility, FIG. 2A illustrates a simplified example of the data hierarchy 204 that represents the sub-models but not the underlying data elements. Additionally, FIG. 2A shows relationships between a few sub-models only for illustrative purposes (e.g., the money provision sub-model 206 and the workflow sub-model 208). In other examples, it is contemplated that the hierarchical data design model 200a may include any number of sub-models with any number of data elements included in the sub-models. Additionally, any data element names, types, structures, and attributes may be used in various examples, and logical relationships may be defined between any data elements (or field/attributes thereof) and any other data elements within the hierarchical data design model 200a.

Data hierarchy 204 shown in FIG. 2A comprises the following set of sub-models, which may combine to form the overall data hierarchy 204 for the P&C insurance system in this example:

Business Event—A sub-model of the hierarchical data design model defining an event of interest to the business which may require action Claim—A sub-model of the hierarchical data design model defining a request for payment of the benefit due under the terms of a policy Collection—A sub-model of the hierarchical data design model describing the relationship between a group of data subject areas (DSAs) that draw together respective terms, thus creating a new data subject concept that is reflected by and aligns with additional terms—which uniquely describe an instance of that relationship. For example, an invoice number, statement date, total amount due, or due date may describe a specific financial statement, which is itself a collection of information from other DSAs.

Communication—A sub-model of the hierarchical data design model that describes correspondence between a customer and the insurance provider.

Company Administration—A sub-model of the hierarchical data design model having information that supports and enables internal operations and is not already grouped in other appropriate DSAs (e.g., includes internal business and IT operations and support, and administrative services).

Financial Account Agreement—A sub-model of the hierarchical data design model having a record or statement of account type related to a particular purpose such as customer, associate, expense, reserve, or legal entity. May includes the demographics related to the account such as account name, account number, and start and end dates.

Identity Verification—A sub-model of the hierarchical data design model having information establishing a level of confidence in a person's identity (e.g., including access management).

Insurable Risk—A sub-model of the hierarchical data design model having information describing exposure to an uncertain outcome due to the behavior of a person or the usage of a physical object as it relates to an agreement that defines the possibility of loss, damage, injury, etc. against which insurance is provided or potential default of a financial product agreement.

Insurance Agreement—A sub-model of the hierarchical data design model having information describing set of contractual terms and conditions under which the insurance provider and one or more people or organizations come to a mutual understanding.

Insurance Financial Product—A sub-model of the hierarchical data design model having information describing an insurance or financial services offering, or an associated revenue generating service.

Location—A sub-model of the hierarchical data design model having information describing a physical place within a geographic area.

Money Provision—A sub-model of the hierarchical data design model having information describing a set of real or potential amounts/cash flows of money that are relevant to the business of the insurance provider, such as premiums, invoices, claims, commissions, salaries, and deductibles, etc.

Party Associate—A sub-model of the hierarchical data design model having information describing a person who provides services to or on behalf of the insurance provider, which may include an agent, employee, or external associate.

Party Customer—A sub-model of the hierarchical data design model having information describing a party who has an agreement with the insurance provider, is involved in a transaction or agreement with the insurance provider, or may benefit from a product or service of the insurance provider.

Party Household—A sub-model of the hierarchical data design model having information describing a grouping of parties considered as one unit.

Party Organization—A sub-model of the hierarchical data design model having information describing an organized body of people with a particular purpose (especially a business, society, association, etc.) who has an agreement with the insurance provider, is involved in a transaction or agreement with the insurance provider, or may benefit from the insurance provider product or service.

Physical Object Item—A sub-model of the hierarchical data design model having information describing an object of value that is insured as a separate specified item on a policy.

Physical Object Structure—A sub-model of the hierarchical data design model having information describing constructed building that is anchored to the ground and used for habitation or commercial purposes.

Physical Object Vehicle—A sub-model of the hierarchical data design model having information describing motorized tangible item, created for transportation.

Physical Object Watercraft—A sub-model of the hierarchical data design model having information describing a boat or other vessel that travels on water.

Policy Transaction—A sub-model of the hierarchical data design model having information describing the creation of or change to an insurance policy.

Third Party—A sub-model of the hierarchical data design model having information describing a party, other than an established customer of the insurance provider that is involved in a transaction, agreement or claim.

Vendor Report—A sub-model of the hierarchical data design model having information describing the data that is provided in a vendor report or the data that is sent to a vendor when requesting a report from a vendor.

Workflow—A sub-model of the hierarchical data design model having information describing a task or group of tasks organized to accomplish a specific objective.

In this example, each node/sub-model in the data design model 200a may be implemented as a single, clean hierarchy, having a single root node and no dual inheritance. Within the distributed system 100, any number of schemas/APIs may contain data elements that cross several subject area boundaries. The data design model 200a illustrates an example of a high-level view of the connections between the sub-model root nodes that may exist within a particular industry. The data design model 200a can be used as a business educational artifact as well as a basis for determining the high-level structure of a message schema or API. As this example illustrates, data design model 200a need not follow a rigid hierarchical structure, but may show the paths that can be navigated to connect data needed within a specific schema/API in a consistent manner. Once the higher-level connections (relationships) are understood, the hierarchical data design model 200a may be used to actually assemble the specific data elements, entities and relationships used within the distributed system 100.

Figure 2B:
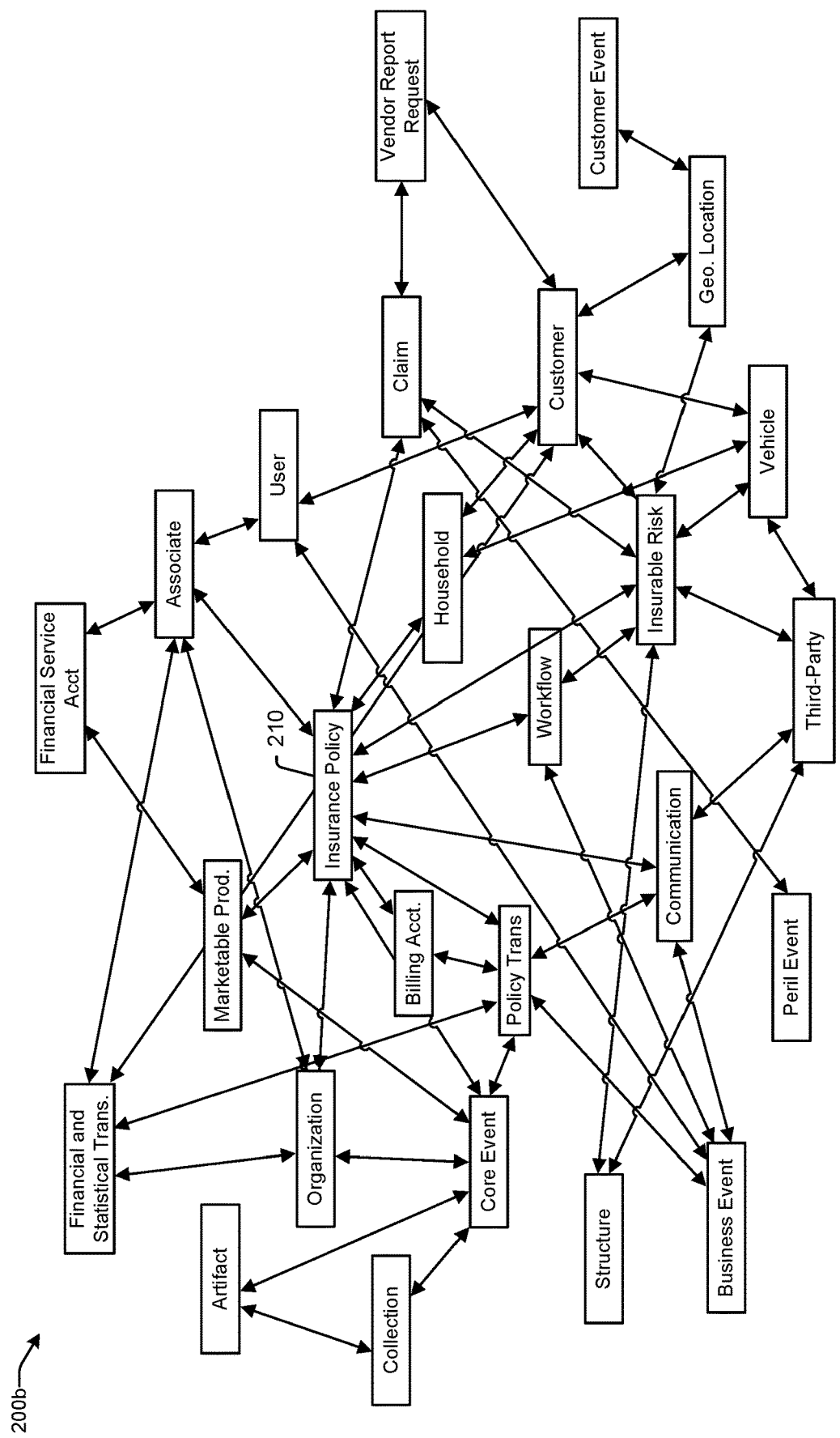

FIG. 2B is another example of a hierarchical data design model 200b that may be used in a P&C insurance system. In this example, the hierarchical data design model 200b may represent a network view of a shared model. In this example, each box in FIG. 2B represents a root node of a particular subject matter area. The arrows in this example illustrate the subject matter connections to the Insurance Policy root node 210. The network view of the hierarchical data design model 200b may be exposed to the independent systems 102-116, through the various interfaces and tools described herein. For example, when a user-initiated operation at an independent system creates a data structure or transaction, the hierarchical data design model 200b may be used to determine the affected data and connections.

Figure 3:
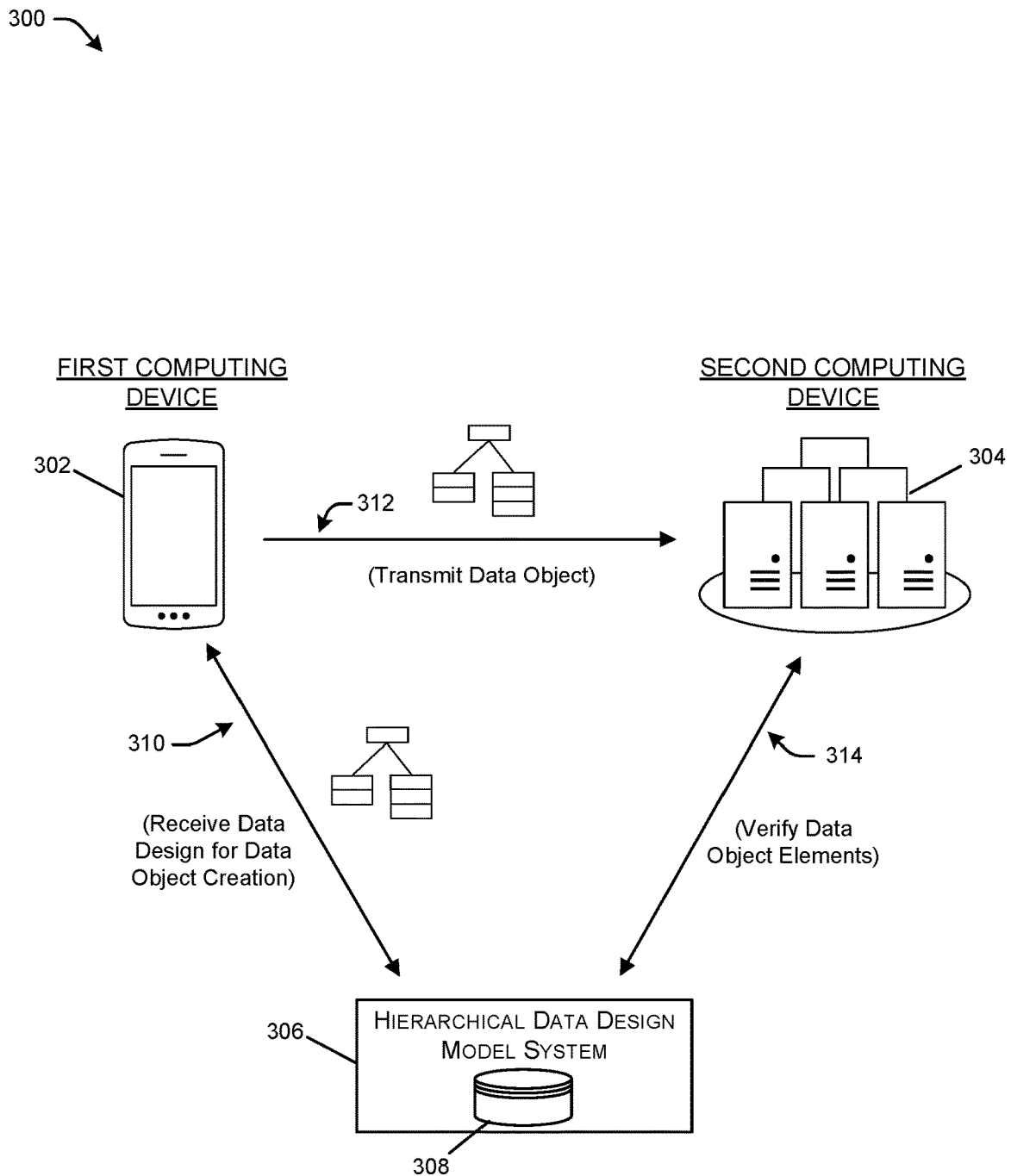
FIG. 3 illustrates a transfer of a data structure between computing devices using a shared hierarchical data design model, in accordance with one or more examples of the present disclosure.

FIG. 3 is a diagram 300 showing an example in which a data object is transferred between a first computing device 302 and a second computing device 304 within a distributed system. As shown in this example, one or both of the computing devices 302 and 304 may access a shared hierarchical data design model 308 to determine and/or verify a data design and definition for the transferred data object. Although the first computing device 302 is depicted as a mobile device and the second computing device 304 is depicted as a data center in this example, it is understood that computing devices 302 and 304 may be similar or identical to any of the systems 102-116 discussed above. Additionally, the shared hierarchical data design model system 306 (or model system 306) may be similar or identical to the shared hierarchical data design model system 120, and the shared model 308 may be similar or identical to the shared model 122.

In this example, arrow 310 represents an interaction between the first computing device 302 and the model system 306, during which the first computing device 302 receives a data design from the model system 306. In various examples, the first computing device 302 may transmit a request to the model system 306 to retrieve a data design based on the shared hierarchical data design model 308. The first computing device 302 may request and/or retrieve any portion of the overall shared model 308 for the distributed system, ranging from a single name or attribute of a single data element to entire sub-model or large portions of the shared model 308. In response to a request from a client system (e.g., the first computing device 302), the model system 306 may retrieve a portion of the shared model 308 associated with the request, and transmit a response to the client system including the portion of the shared model 308. The data design received from the model system 306 may include information regarding individual data elements (e.g., element names, structures, types, element dependencies and relationships, etc.) and/or larger portions of the shared model 308 such as grouping of related elements, sub-models, or the entire shared model 308.

After receiving the data design from the hierarchical data design model 308, the first computing device 302 designs and/or creates a data object based on the data design. As used herein, a data object may refer to any software object or storage object configured to store or transmit structured data. In various examples, the data object designed/created by the first computing device 302 may comprise software components (e.g., functions, applications, services), data structures, and/or application programming interfaces (APIs). The first computing device 302 may create the data object to conform to the data design received from the model system 306, including creating the data object with matching data element names, matching data element structures and/or data types, matching data element attributes, and matching relationships between data elements. In some examples, the first computing device 302 may use the data design received from the model system 306 to design and create a new data object (e.g., software component or data structure), while in other examples the first computing device 302 may use the data design to verify that an existing data object conforms to the shared hierarchical data design model 308.

Arrow 312 represents the first computing device 302 transferring the data object to the second computing device 304. As used herein, a data transfer may refer to any transmission of data between components and/or devices within a distributed system. In some instances, the data transfer may correspond to the execution of a software process on the first computing device 302 that is configured to create and transmit a data structure to a storage location or other software process or service on the second computing device 304. In other instances, the data transfer may correspond to a software process (e.g., software application or service) executing on the first computing device 302, which is configured to create and transmit a data structure to another software application or service executing on the second computing device 304 or a storage system on the second computing device 304. In other instances, the data transfer may correspond to a transfer process, such as a data migration or replication process, configured to transfer data objects from the first computing device 302 to the second computing device 304. Additionally, although this example illustrates a data object transferred between two different computing devices 302 and 304, in other examples the techniques described herein may apply to data transfers between two different executing software components (e.g., functions, applications, or services) and/or two different storage systems on the same computing device.

Continuing this example, arrow 314 represents an interaction between the second computing device 304 and the model system 306, in which the second computing device 304 verifies that the data object received from the first computing device 302 conforms to the shared model 308. In some examples, the second computing device 304 may determine one or more data elements based on the data object received from the first computing device 302 (e.g., constituent objects within a data structure), and may request the data element names, structures, data types, and/or relationships for the corresponding data elements from the shared model 308. The second computing device 304 may compare the data element name, attributes, and relationships for the data elements associated with the received data object, to the matching data elements retrieved from the model system 306, to verify that the received data object conforms with the shared model 308. As discussed below, after verifying that the received data object conforms with the shared model 308, the second computing device 304 may proceed to store and/or utilize the data object in subsequent operations. In contrast, if the second computing device 304 determines that the received data object does not conform with the shared model 308, the second computing device 304 may perform one or more remediation actions before utilizing the data object.

As shown in this example, when a data object is transferred between devices in a distributed system, both the transferring device (e.g., first computing device 302) and the receiving device (e.g., second computing device 304) may access the model system 306, and the shared hierarchical data design model 308 stored thereon, to create the data object and/or verify that the data object conforms to the shared model 308. Verification of the conformance of the data object on both ends of the data transfer may provide technical advantages in some examples, such as when the independent components of the distributed system cannot assume that the other components will access the shared model 308, and/or when data objects are transferred or received from external systems outside of the distributed systems which do not access the model system 306 or shared model 308. In other cases, the first computing device 302 and/or second computing device 304 may be configured so that only one of the transferring device or the receiving device verifies that the data object conforms to the shared model 308. Additionally, in some implementations, one or more separate components (e.g., an intermediary network device between the first and second computing devices 302-304) may access the model system 306 to verify conformance of the data object. Further, as noted above the techniques described herein for verifying conformance of transferred data objects may apply to various types of data objects (e.g., software components creating and transmitting data objects, databases and other data structures, API's, etc.). Additionally, these techniques may apply to various types of data transfers including component to component transfers within an executing software process, application to application transfers between executing software applications or services, and data transfers between storage systems/devices, including data transfers between different components, processes, or systems within a single device or server, and data transfers between different devices and/or servers.

Figure 4:
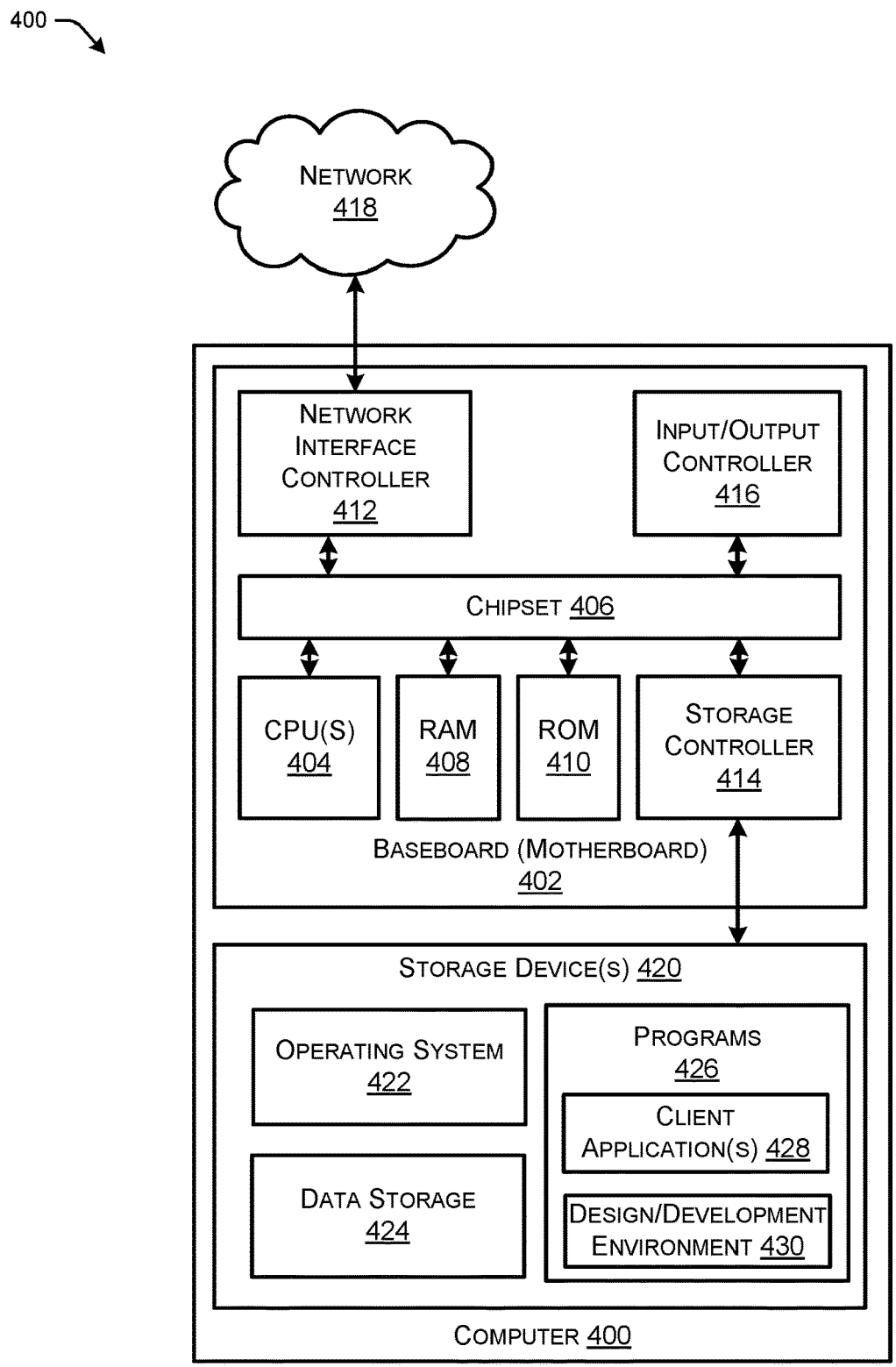
FIG. 4 is an example computer architecture for a computer capable of executing program components for implementing various techniques described herein.

FIG. 4 shows an example computer architecture for a computer 400 capable of executing program components for implementing the functionality described herein. The computer architecture shown in FIG. 4 may correspond to the systems and components of a server computer, workstation, desktop computer, laptop, tablet, network appliance, mobile device (e.g., tablet computer, smartphone, etc.), or other computing device, and can be utilized to execute any of the software components presented herein. The computer 400 may, in some examples, correspond to any of the computing systems or devices described above, such as independent systems 102-116, a hierarchical data design model system 120, or computing devices 302-304. It will be appreciated that in various examples described herein, a computer 400 might not include all of the components shown in FIG. 4, can include other components that are not explicitly shown in FIG. 4, and/or may utilize a different architecture from that shown in FIG. 4.

The computer 400 includes a baseboard 402, or "motherboard," which may be a printed circuit board to which a multitude of components or devices are connected by way of a system bus or other electrical communication paths. In one illustrative configuration, one or more CPUs 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, having registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a ROM 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 418, which may be similar or identical to network 118 discussed above. The chipset 406 also may include functionality for providing network connectivity through a Network Interface Controller (NIC) 412, such as a gigabit Ethernet adapter. The NIC 412 is capable of connecting the computer 400 to other computing devices over the network 418. It should be appreciated that multiple NICs 412 can be present in the computer 400, connecting the computer to other types of networks and remote computer systems. In some instances, the NICs 412 may include at least on ingress port and/or at least one egress port.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device.

The computer 400 can include one or more storage device(s) 420, which may be connected to and/or integrated within the computer 400, that provide non-volatile storage for the computer 400. The storage device(s) 420 can store an operating system 422, data storage systems 424, and/or programs 426, which are described in more detail herein. The storage device(s) 420 can be connected to the computer 400 through a storage controller 414 connected to the chipset 406. The storage device(s) 420 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device(s) 420 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 420 are characterized as primary or secondary storage, and the like.

For example, the computer 400 can store information to the storage device(s) 420 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device(s) 420 by detecting the physical states or characteristics of one or more particular locations within the physical storage units.

In addition to the storage device(s) 420 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the various operations performed by a computing system (e.g., independent systems 102-116, computing devices 302-306) may be supported by one or more devices similar to computer 400. Stated otherwise, some or all of the operations described herein may be performed by one or more computers 400 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 420 can store an operating system 422 utilized to control the operation of the computer 400. In some examples, the operating system 422 comprises a LINUX operating system. In other examples, the operating system 422 comprises a WINDOWS® SERVER operating system from MICROSOFT Corporation of Redmond, Washington. In further examples, the operating system 422 can comprise a UNIX operating system or one of its variants. It should be appreciated that other operating systems can also be utilized. The storage device(s) 420 can store other system or application programs and data utilized by the computer 400.

In various examples, the storage device(s) 420 or other computer-readable storage media is encoded with computer-executable instructions which, when loaded into the computer 400, transform the computer from a general-purpose computing system into a special-purpose computer capable of implementing various techniques described herein. These computer-executable instructions transform the computer 400 by specifying how the CPUs 404 transition between states, as described above. In some examples, the computer 400 may have access to computer-readable storage media storing computer-executable instructions which, when executed by the computer 400, perform the various techniques described herein with regard to FIGS. 1-3 and 5-7. The computer 400 can also include computer-readable storage media having instructions stored thereupon for performing any of the other computer-implemented operations described herein.

As illustrated in FIG. 4, the storage device(s) 420 may store one or more data storage systems 424 configured to store data structures and other data objects. Additionally, the programs 426 stored on the computer 400 may include one or more client applications 428 and/or design/development environments 430. In some implementations, at least one of the client applications 428 or the design/development environments 430 may be omitted. In some instances, the client application(s) 428 may include any combination of the executable applications within a distributed P&C insurance system described herein. For example, client application(s) 428 may implement various P&C insurance-related features and functionalities, during which the client application(s) 428 may design, create, and/or transfer data structures to or from the computer 400. In such examples, the client application(s) 428 may include functionality to access a shared hierarchical data design model 308 and determine whether the data structures designed, created, and/or transferred by the client application(s) 428 conform with the shared model 306. In other examples, client application(s) 428 may include tools to retrieve and data objects from the data storage system 424 of the computer 400 and verify that the stored data objects conform with the shared model 306. Such verification may be performed before or after a data transfer between computing devices or servers in some examples.

Additionally, the programs 426 stored on the computer 400 may include one or more design/development environments 430 or other software-based tools configured to design, build, and deploy software components and/or data storage systems (e.g., databases, data objects). As described in more detail below, a design/development environment 430 may access the shared hierarchical data design model 308 to facilitate the design and development of data storage object and structures, and software components, to verify that data storage objects/structures and the data objects/structures transferred by software components conform with the shared model 306.

Figure 5:
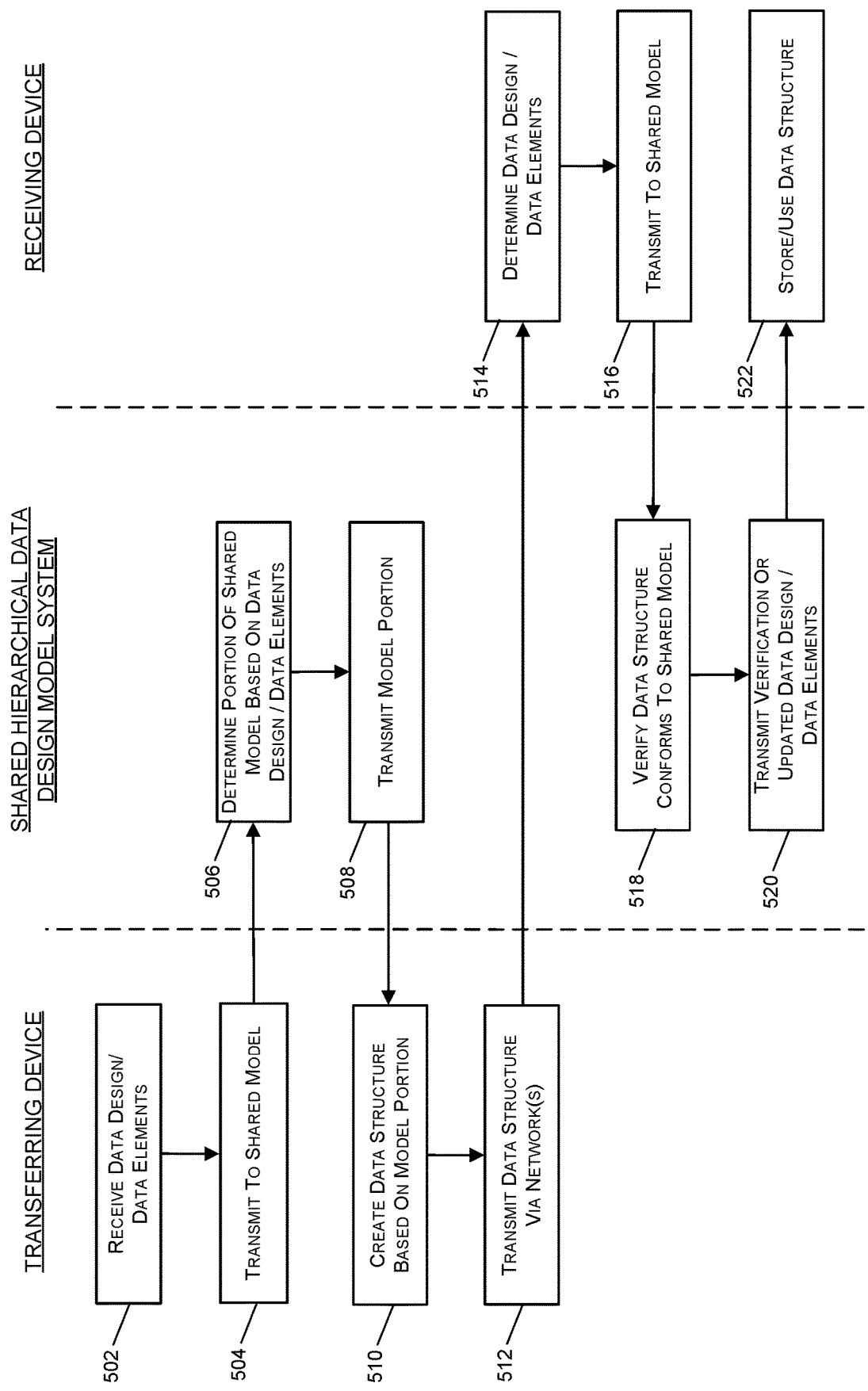
FIG. 5 is a swim lane diagram illustrating transmission of a data structure between computing devices, using a shared hierarchical data design model, in accordance with one or more examples of the present disclosure.

FIG. 5 is a swim lane diagram illustrating a process 500 of transmitting of a data structure between computing devices using a shared hierarchical data design model. In some examples, the process 500 may be similar to identical to the data object transfer described above in reference to FIG. 3. The transferring and receiving devices in this example may correspond to the first and second computing devices 302 and 304, and/or to any of the systems 102-116 in the distributed system described above. Additionally, the shared hierarchical data design model system in this example may correspond to the model systems 120 and/or 306, and may store one or more hierarchical data design models as described herein. Further, although this example depicts a transfer of a data structure between devices, the techniques described herein may apply to transfers of any type of data object, such as data transfers via software processes, invocations of APIs, etc., and also may apply to transfers of data objects or structures between different components/systems of a single computing device.

At operation 502, the transferring device receives a data design and/or data elements, for example, via user interface or programmatic interface executing on the transferring device. As described herein, a data design may refer to a logical definition of one of more data elements. In some examples, a data design may comprise a complete definition of a data element and/or multi-element data structure, including data element names, structures, data types, attributes, and the organizations/relationships between the data elements (e.g., derived data elements, dependencies, etc.). In other examples, a data design may comprise a partial definition of a data element and/or data structure. For instance, a data design received at operation 502 may include one or more data element names and relationships between the elements, but might not include the data element structures/types and other attributes.

In various examples, the data design received by the transferring device at operation 502 may be a partial data design such as a listing of one or more data element names or descriptions, or may be a complete data design such as fully implemented data structure. The data design may be received via a user interface or programmatic interface of a client application 428 or design/development environment 430 executing on the transferring device. Additionally or alternatively, operation 502 may comprise identifying a data structure stored in the data storage systems 424 of the transferring device. The data design may represent any defined data structure, or any portion thereof, that the transferring device may store and/or transfer to another device within a distributed system.

At operation 504, the transferring device transmits the data design and/or data elements received in operation 502, to the shared hierarchical data design model. In some examples, operation 504 may comprise transmitting individual element data, such as one or more data element names, attributes, and/or descriptions to the shared model. In a simple example, the transferring device might transmit only a single data element name, a single attribute, or a single description of a data element to the shared model in operation 504. In other examples, the transferring device may transmit information identifying multiple data elements and/or relationships between the data elements, and in still other examples the transferring device may transmit complete defined data structures to the shared model in operation 504.

At operation 506, the shared hierarchical data design model system (or model system) determines a portion of the shared model based on the data design/data elements received from the transferring device. In some examples, the model system may access the hierarchical data design model (or shared model) stored thereon, and attempt to find data element matches by comparing the data design received from the transferring device to the data elements of the shared model. For instance, when the transferring device provides a data element name, the model system may look up the data element name within the element name listing (e.g., inventory 202) of the shared model. If an exact name match is found, the model system may determine that the data element corresponds to the data element name provided by the transferring system. If a near or partial match is found within the shared model, the model system may perform a rules-based analysis to determine whether or not data element name provided by the transferring system corresponds to the near or partial match. Similar techniques may be performed by the model system in operation 506 to determine which data elements from the shared model match the data elements received from the transferring device, based on text comparisons and analyses of data element descriptions, data element types, structures, or attributes, or based on the relationships between multiple data elements provided by the by the transferring system.

At operation 508, the model system identifies one or more portions of the shared hierarchical data design model (or shared model) for the distributed system, based on the data received from the transferring device, and transmits the shared model back to the transferring device. The shared model portions transmitted in operation 508 may comprise complete definitions of one or more data elements, including the element names, structures, attributes, and relationships from the shared model. Additionally or alternatively, the shared model portions transmitted in operation 508 may include sub-models and/or hierarchies of data elements which may comprises sub-structures of the overall shared model defined for the distributed system.

At operation 510, the transferring device creates a data structure based on the shared model portions received from the model system in operation 508. As discussed above, the creation of the data structure may include various types of data structures created using various techniques. In some examples, creating the data structure in operation 510 may include creating executable software code that defines and instantiates the data structure within a software component (e.g., function, application, or service). In other examples, creating the data structure in operation 510 may include defining a database or other data structure to be stored within a data storage system. In still other examples, creating the data structure may include creating an API, creating a data migration/replication task, etc., during which the data structure defines the data to be accessed and transferred. In any of these examples, by using the relevant data retrieved from the shared model, the transferring device may design and create data structures that conform the shared model used within the distributed system.

At operation 512, the transferring device transmits the data structure created in operation 510 to the receiving device. As noted above, the transfer in operation 512 may comprise any of the various types of data transfers described herein, including component-to-component data transfers that occur within a single executing software process, application, or service, application-to-application transfers between two different software applications or services executing on the transferring device and receiving device, and/or data transfers (e.g., data migration or replication) between a storage system on the transferring device and a storage system on the receiving device.

At operation 514, the receiving device determines a data design and/or data elements based on data structure received from the transferring device. In some examples, operation 514 may be similar or identical to operation 502, in which the receiving device may extract out data elements from the received data structure and/or analyze the received data structure to determine element names, attributes, and/or relationships between the data elements.

At operation 516, the receiving device may transmit the data design and/or data elements determined in operation 514 to the shared system. Operation 516 may be similar or identical to operation 504 in some examples. However, in contrast to operation 504 where the transferring device might have only a partial data design, the receiving device may have a complete data structure in operation 516. Accordingly, the receiving device may transmit some or all of the data defining the data structure, including data element names, structures, attributes, and relationships, to the model system in operation 516.

At operation 518, the model system may use the data design/data elements received from the receiving system to verify that the data structure transferred in operation 512 conforms to the shared model for the distributed system. Operation 518 may be similar or identical to operation 506. For example, the model may attempt to match the data design and/or data elements provided by the receiving system, using the inventory (e.g., 202) and/or hierarchy (e.g., 204) of the shared model. If the model system verifies that the data elements from the receiving device are a match for the corresponding data elements in the shared model (e.g., having a matching element name, structure, type, attributes, and relationships), the model system may determine that the data structure conforms to the shared model. In contrast, if one or more portions the data design and/or data elements corresponding to the received data structure do not match the shared model, the model system may determine that the data structure does not conform to the shared model.

At operation 520, the model system may transmit to the receiving device a response to the verification request. As discussed above, the response may include verification that the data structure received from the transferring device in operation 512 conforms to the shared model for the distributed system. Alternatively, the response may in operation 520 may indicate that the data structure does not conform to the shared model, in which case the model system also may provide updated data design and/or data elements that the receiving device may use to modify the data structure to conform with the shared model. In some examples, if the model system indicates to the receiving system that the data structure does not conform to the shared model, the receiving system may inform the transferring device and/or may reject the data structure or request an updated data structure from the transferring device.

At operation 522, the receiving system may store and/or utilize the received data structure, in response to the conformation from the model system that the data structure conforms to the shared model. As noted above, in some examples the model system might be accessed by only one of the devices, either by the transferring device to assure conformance of the data structure to the shared model before the transfer, or by the receiving device to assure conformance of the data structure to the shared model after the transfer. Such examples may provide increased speed and efficiency in scenarios when a component or device in a distributed system may safely assume that the components/devices will verify conformance with the shared model. However, as shown in this example it may be advantageous for both the transferring device and the receiving device to access the model system and verify conformance with the shared model in some scenarios.

Figure 6:
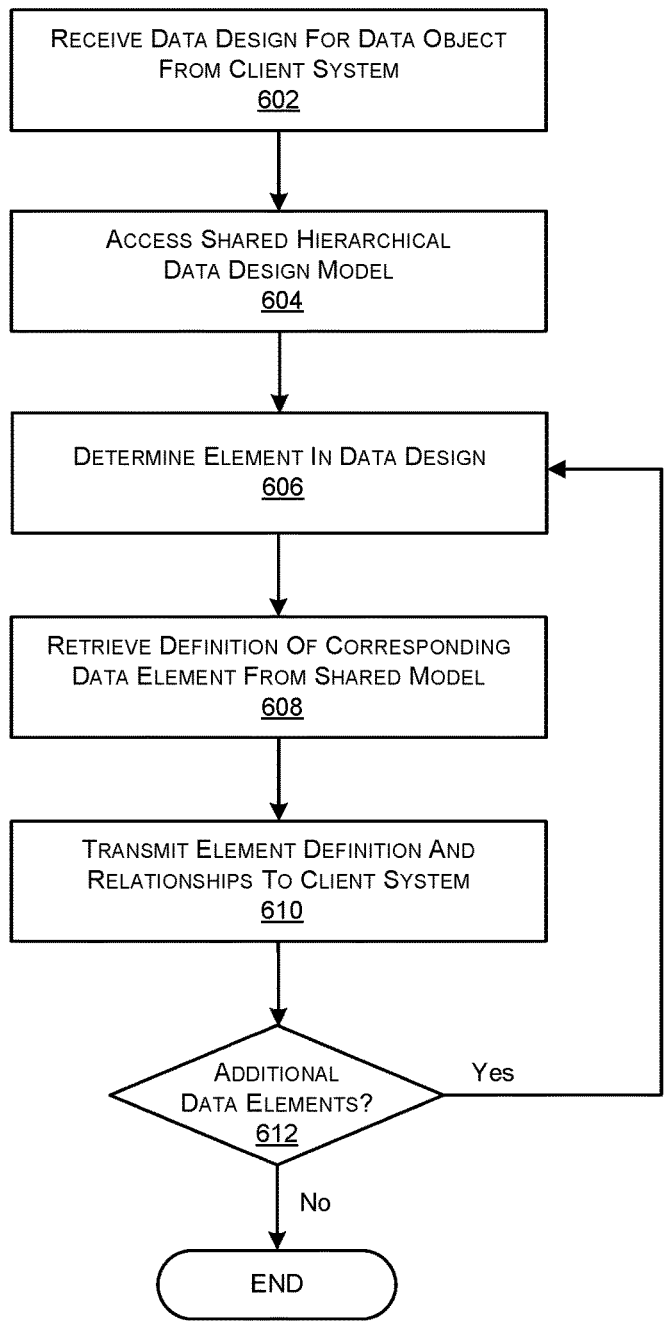
FIG. 6 is a flow diagram illustrating the creation of a data object using a shared hierarchical data design model, in accordance with one or more examples of the present disclosure.
Figure 7:
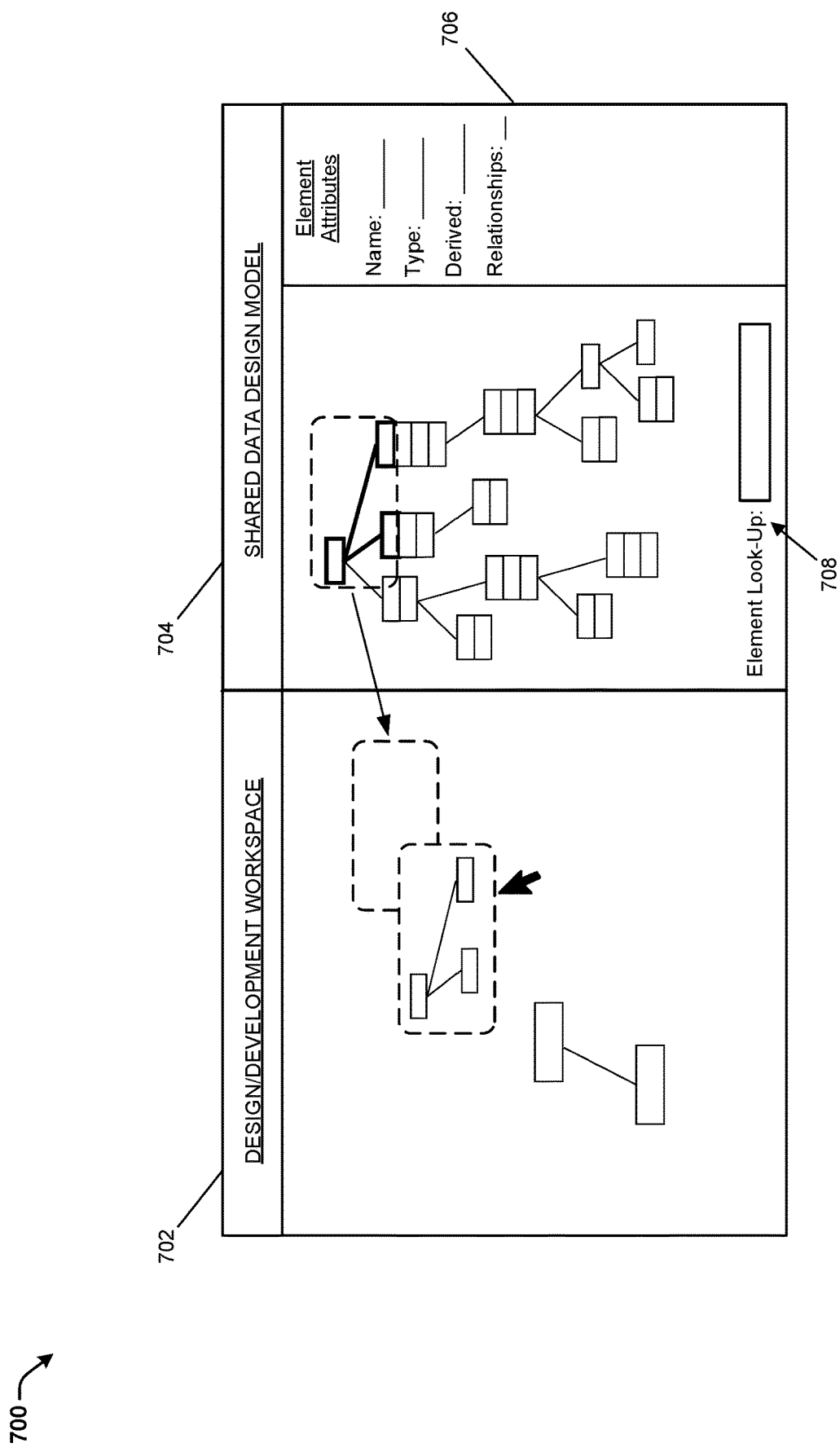
FIG. 7 illustrates an example software-based data design and development environment incorporating a shared hierarchical data design model, in accordance with one or more examples of the present disclosure.

FIG. 6 is a flow diagram illustrating a process 600 of creating a data object using a shared hierarchical data design model. In some examples, the process 600 may be similar and/or related the processing of creating the data object to be transferred described in reference to FIG. 3, and the process of creating of the data structure by the transferring device described in reference to FIG. 5. The operations in process 600 may be performed by a client system, which may correspond to the first and second computing devices 302 and 304 and/or to any of the systems 102-116 in the distributed system described above, and/or by a shared hierarchical data design model system (or model system) which may correspond to the model systems 120 and/or 306 and may store a hierarchical data design models (or shared model) as described above.

As described above, the systems and techniques described herein may be implemented in a similar manner for creating data structures/objects that conform with the shared hierarchical data design model, and for verifying that existing data structures/objects conform with the shared model. Accordingly, although this example is described in reference to creating a conforming data structure on a client system, it is understood that a similar process may be implemented to verify whether a previously created data structure conforms with the shared model.

At operation 602, the model system (e.g., 120 or 306) receives a data design for a data object associated with a client system. In this example, the operations are described from the perspective of the model system; however, it is understood that corresponding operations are performed by the client system (e.g., any of systems 102-116 or 32-304). The data design received in operation 602 may comprise a multi-element data design received by the client system, for example, via a user interface, a programmatic interface, or received from an external system. A multi-element data design refers to a design for a data object/structure that includes at least two distinct data elements. In various examples, process 600 may be used to determine complete data objects/structures that conform with the shared hierarchical data design model, based on data designs received from client systems that are incomplete and/or non-conforming. Accordingly, in some examples the data received by the model system in operation 602 may comprise a listing of data elements (e.g., element names, descriptions, etc.) and/or relationships associated with the listing of data elements (e.g., dependencies, derived elements, etc.), in which either the listing of data elements or the relationships are incompletely defined or do not conform to the shared model. Additionally or alternatively, the data received by the model system in operation 602 may comprise a complete and fully defined data object that do not conform to the shared model in one or more respects, such as one or more non-matching element names, element structures, element data types, or relationships between elements.

At operation 604, the model system may access the shared hierarchical data design model (or shared model) for the distributed system. The shared model may be similar or identical to the shared models 122 and 308 discussed above.

At operations 606-612, the model system may iterate through the operations of determining a first/next element of the data design received from the client system (operation 606), retrieving a definition of the corresponding data element from the shared model (operation 608), and transmitting the definition back to the client system (operation 610), for the data elements in the data design received from the client system in operation 602. As discussed above, the data design received from the client system may be incomplete (e.g., not including certain element names, types, attributes, or relationships) and/or may be non-conforming (e.g., having different element names, types, attributes or relationships) with the element data from the shared model. Accordingly, in operation 608 for the elements in the data design received from the client system, the model system may compare the element data to the shared model to attempt to determine a matching data element.

In some examples, the model system may compare the data element name received from the client system the element name listing (e.g., inventory 202). If a match is found within the shared model for the data element name, the model system may retrieve the definition for the matching data element in operation 608 and transmit it to the client system in operation 610. In some examples, if an exact match is not found within the shared model for the data element name, the model system might make no further attempt to determine the corresponding element within the shared model, and may notify that client system that that element of the data design does not conform with the shared model and must be removed or replaced. However, in other examples, if an exact match is not found within the shared model for the data element name, the model system may attempt to determine the closest matches and/or partial matches for the element name within the shared model. For instance, the model system may analyze multiple close and/or partial name matches to determine which data element in the shared model is the corresponding/matching data element. The model system may perform text-based analysis and/or use a name similarly threshold to determine whether a data element in the shared model is the corresponding data element. In some examples, the model system may analyze the additional data from the data design to determine a corresponding data element which the element name cannot be resolved with a sufficient level of confidence. For instance, when an exact element name is not found within the inventory of the shared model, the model system may analyze the element description, additional attributes or relationships of the element with the data design, to determine the corresponding element in the shared model. Additionally or alternatively, the model system may determine the corresponding element in the shared model based on the context of the other elements in the data design provided by the client system, and/or based on the functionalities typically associated with the client system. For example, the model system may determine a role associated with the client system or client application (e.g., customer, agent, underwriting, fraud detection, etc.), and may determine based on historical data which data elements in the shared model are most likely to be used by client systems or applications of that role.

By way of illustration, in a first example scenario, data within the distributed system may be conformed prior to processing. For instance, data element tag names may be changed to conformed tag names and/or restructured to conform to the shared model 122. A database may contain one or more non-conformed data element source-names by which the conformed data element may be known. The model system may include programming configured to create conformed views of data by accessing a name lineage table within the database, passing in a source name, and having the conformed name returned. If the source name is not found in the database, the model system may determine the appropriate target name using various internal or external sources, and may add a new row to the name lineage table. In some cases, the model system may use fuzzy match logic to return close matches. Additionally or alternatively, the model system may transmit notifications of such close matches to an administrator for manual review to determine the appropriate conformed data name.

In a second example scenario, one or more components/roles within the distributed system 100 may require the conformed name for a data element. In such examples, one of the independent systems 102-116 may query a metadata delivery system, in which the independent system may retrieve a variety of metadata, including conformed data element name and/or other names by which a requested data element is known. The model system may use fuzzy match logic to return close matches. A user via the independent system may select from the returned close matches to perform additional research from the model system. For instance, a user may request the file(s) the selected source data element exists within, and/or where the file(s) are created and how they move through the distributed environment of the organization.

In some examples, process 600 may be initiated by a client application 428 executing on the client device, in response to a data design input by a user via a user interface. For instance, referring briefly to the FIG. 7, an example user interface 700 is shown of a software-based design and development environment. The design and development environment in this example may correspond to the design/development environment 430 discussed above, and may include any combination of design tools, development tools, build/test tools, and deployment tools both for software components and/or data objects. In this example, a user may interact with a graphical workspace 702 provided by the user interface to design a data structure. The user may build a graphical representation of a data object within the workspace 702 by adding and defining data elements and/or by importing data elements from the shared data design model window 704. As shown, the design and development environment in this example allows the user to select and drag-and-drop individual data elements and/or groups of related elements from the shared hierarchical model in window 704 to the workspace 702. Additionally, whenever a data element is selected from the shared model in window 704, the attributes of the selected element are retrieved and displayed within the sub-window 706. Further, the design and development environment in this example also supports a direct data element look-up and retrieval functionality using an element look-up input 708. In this example, a user may input a data element name (which may be known or guessed by the user) and/or a data element description in the input 708. The design and development environment may attempt to determine the corresponding data element from the shared model, which may be an exact match or a partial/closest match from the data element inventory of the shared model.

Additionally, in some implementations, the design and development environment may determine a present a recommendation of a data element to add to the workspace 702, based on the previous data elements selected and imported by the user from the shared model window 704 into the workspace 702. For instance, the design and development environment may recommend data elements which are dependent on previously selected data elements, and/or data elements that are direct child or parent elements of previously selected data elements within the shared hierarchy.

In some examples, the model system 120 may be used to build conformed "views" of data for analysis by actuaries, data scientists, data engineers, and/or individuals or automated systems that determine what data is predictive and can be used to build business models to automate various industry-specific business operations (e.g., rating and underwriting processes for the insurance industry). In some cases, such business models may be implemented into production but need not access any artifacts of the shared model 122 during operational production processing.

In some instances, the hierarchical data design model 308 is used to build conformed "views" of data for analysis by actuaries, data scientists and data engineers who decide what data is predictive and can be used to build business model which will automate rating and underwriting processes. In some cases, such business models are implemented into production but do not access any artifacts of the hierarchical data design model 308 during operational production processing.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A system, comprising:
  a data design system storing a hierarchical data design model; and
  a first computing device comprising at least one processor and memory storing executable instructions that, when executed by the at least one processor, cause the first computing device to perform operations comprising:
    receiving, by a first computing device and from a transmitting system, a data structure comprising a plurality of data elements;
    receiving, from the data design system, at least a portion of a hierarchical data design model, the hierarchical data design model defining a shared inventory of common data element definitions and relationships for a distributed system;
    determining that a first data element in the hierarchical data design model is associated with a second data element in the data structure;
    receiving, from the hierarchical data design model, a definition of the first data element;
    determining, based at least in part on the first data element and the second data element in the data structure, that the received data structure conforms to the hierarchical data design model; and
    based at least in part on determining that the received data structure conforms to the hierarchical data design model, storing the received data structure on the first computing device.

2. The system of claim 1, wherein retrieving at least a portion of the hierarchical data design model comprises:
  identifying the first data element within the hierarchical data design model by determining that a first element name of the first data element matches a second element name of the second data element in the data structure.

3. The system of claim 1, wherein retrieving at least a portion of the hierarchical data design model comprises receiving, from the hierarchical data design model:
  a first unique identifier of the first data element;
  a first data type name of the first data element; and
  a first dependency of the first data element.

4. The system of claim 3, wherein determining that the received data structure conforms to the hierarchical data design model comprises:
  verifying that the second data element of the data structure has the first unique identifier, the first data type, and the first dependency.

5. The system of claim 1, wherein the data structure received from the transmitting system comprises at least one of:
  a data structure within a software program component;
  an application program interface (API); or
  a database.

6. The system of claim 1, the operations further comprising:
  determining a first hierarchical level of the first data element within the hierarchical data design model;
  determining a second hierarchical level of the second data element within the data structure; and
  determining that the first hierarchical level matches the second hierarchical level.

7. The system of claim 1, wherein the transmitting system comprises a computer server operating on a private secure computer network, and wherein the first computing device comprises a customer mobile device operating on an unsecure computer network.

8. The system of claim 1, the operations further comprising:
  determining that a first attribute of the first data element does not match a second attribute of the second data element; and
  preventing a usage of the received data structure on the first computing device, based at least in part on determining that the first attribute of the first data element does not match the second attribute of the second data element.

9. A method, comprising:
- receiving, by a target system and from a transmitting system, a data structure comprising a plurality of data elements;
- receiving, from a data design system, at least a portion of a hierarchical data design model, the hierarchical data design model defining a shared inventory of common data element definitions and relationships for a distributed system;
- determining that a first data element in the hierarchical data design model is associated with a second data element in the data structure;
- receiving, from the hierarchical data design model, a definition of the first data element;
- determining, based at least in part on the first data element and the second data element in the data structure, that the received data structure conforms to the hierarchical data design model; and
- based at least in part on determining that the received data structure conforms to the hierarchical data design model, storing the received data structure on the target system.

10. The method of claim 9, wherein retrieving at least a portion of the hierarchical data design model comprises:
- identifying the first data element within the hierarchical data design model by determining that a first element name of the first data element matches a second element name of the second data element in the data structure.

11. The method of claim 9, wherein retrieving at least a portion of the hierarchical data design model comprises receiving, from the hierarchical data design model:
- a first unique identifier of the first data element;
- a first data type name of the first data element; and
- a first dependency of the first data element.

12. The method of claim 11, wherein determining that the received data structure conforms to the hierarchical data design model comprises:
- verifying that the second data element of the data structure has the first unique identifier, the first data type, and the first dependency.

13. The method of claim 9, wherein the data structure received from the transmitting system comprises at least one of:
- a data structure within a software program component;
- an application program interface (API); or
- a database.

14. The method of claim 9, further comprising:
- determining a first hierarchical level of the first data element within the hierarchical data design model;
- determining a second hierarchical level of the second data element within the data structure; and
- determining that the first hierarchical level matches the second hierarchical level.

15. The method of claim 9, wherein the transmitting system comprises a computer server operating on a private secure computer network, and wherein the target system comprises a customer mobile device operating on an unsecure computer network.

16. The method of claim 9, further comprising:
- determining that a first attribute of the first data element does not match a second attribute of the second data element; and
- preventing a usage of the received data structure on the target system, based at least in part on determining that the first attribute of the first data element does not match the second attribute of the second data element.

17. A system, comprising:
- a data design system storing a hierarchical data design model; and
- an intermediary computing device comprising at least one processor and memory storing executable instructions that, when executed by the at least one processor, cause the intermediary computing device to perform operations comprising:
  - receiving, by the intermediary computing device and from a transmitting system, a data structure comprising a plurality of data elements;
  - receiving, from the data design system, at least a portion of a hierarchical data design model, the hierarchical data design model defining a shared inventory of common data element definitions and relationships for a distributed system;
  - determining that a first data element in the hierarchical data design model is associated with a second data element in the data structure;
  - receiving, from the hierarchical data design model, a definition of the first data element;
  - determining, based at least in part on the first data element and the second data element in the data structure, that the received data structure conforms to the hierarchical data design model; and
  - based at least in part on determining that the received data structure conforms to the hierarchical data design model, transmitting the received data structure to a target system.

18. The system of claim 17, wherein retrieving at least a portion of the hierarchical data design model comprises receiving, from the hierarchical data design model:
- a first unique identifier of the first data element;
- a first data type name of the first data element; and
- a first dependency of the first data element.

19. The system of claim 18, wherein determining that the received data structure conforms to the hierarchical data design model comprises:
- verifying that the second data element of the data structure has the first unique identifier, the first data type, and the first dependency.

20. The system of claim 17, wherein the data structure received from the transmitting system comprises at least one of:
- a data structure within a software program component;
- an application program interface (API); or
- a database.

* * * * *